United States Patent Office 3,373,672
Patented Mar. 19, 1968

3,373,672
LENS SHUTTER
Yasunori Ichijo, Kanagawa-ken, and Yukio Nakamura, Chiba-ken, Japan, assignors to Kabushiki Kaisha Hattori Tokeiten
Filed June 30, 1964, Ser. No. 379,155
Claims priority, application Japan, July 3, 1963, 38/34,824
4 Claims. (Cl. 95—63)

The present invention relates to a photographic camera lens shutter system which provides for automatic camera operation without the use of a separate exposure meter, and where a pair of shutter blades control both the shutter speed and aperture exposure. The advantage of such a lens shutter system resides in the fact that, whereas, two pairs of sector blades are necessary in presently used camera systems, in the present invention, only one pair of sector blades control both the shutter speed and aperture opening.

In the present invention, an opening shutter member and a closing shutter member are provided with each of these members being driven by its independent motive power for opening and closing the aperture respectively. The opening shutter member is connected to a delayed action governor so that the time taken to achieve full opening of the aperture may be preselected in accordance with the particular camera used and the requirements of the subject to be photographed. Generally, for ordinary amateur use, the time for full opening of the aperture will be typically 16 milliseconds. The closing shutter member, which is driven by its own motive power is operative to close the aperture at a high speed typically less than 10 milliseconds.

An important feature of the present invention is the control of the closing shutter member by a magnet in combination with an electronic delay circuit which is operative to automatically adjust the exposure time in accordance with the illumination intensity of the subject to be photographed.

Typically, when the diaphram aperture is F2.8, the closing shutter member aperture will be released by the magnet to close the aperture in about 6 milliseconds. In such a case, the time for achieving complete opening of the aperture is about 66 milliseconds and the effective exposure time is 33 milliseconds i.e. about $\frac{1}{30}$ of a second for $F=2.8$ and the light intensity $L.V.$ equal 8. For the case of a light intensity $L.V.=17$ and an aperture $F=22$, the time delay for the shutting member is 7 milliseconds, and the shutting member closes the aperture sector in one millisecond to achieve an effective exposure time of four milliseconds (about $\frac{1}{250}$ of a second).

Thus, the delay time between actuation and operation of the closing shutter member and the aperture size can correspond to a preselected relation between the opening time and the aperture, while the delay time of the closing shutter member is controlled by a magnet in response to the light intensity of the subject.

An important feature of the present invention resides in the provision of an alarm circuit to indicate when there is an insufficient amount of light coming from the subject to be photographed in order to obtain suitable exposure. Accordingly, before the opening sectors begin to open, the release member closes a switch connected to the alarm lamp so that the alarm will be lighted and visible in the view finder of the camera.

A further feature of the present invention resides in the provision of a switch circuit whereby the opening shutter member at the beginning of operation closes a switch when the shutter is released, and by virtue of the movement of the opening shutter member at time interval from the closing of the magnet switch to the beginning of the opening of the sectors may be made constant, thereby insuring that the beginning time of operation of the closing shutter member by the magnet is relative to the light intensity of the subject only.

The present invention provides a shutter control system for an automatic exposure camera in which the sectors open gradually to a determined relation between the shutter time and diaphragm aperture and wherein the closing magnet is automatically controlled by an electronic control circuit.

The features of the present invention which are believed to be novel are set forth with particularity in the appendant claims. The invention, itself, however both as to its organization and method of operation, together with further objects and features thereof may best be understood with reference to the following description taken in conjunction with the accompanying drawings wherein:

Figure 4:
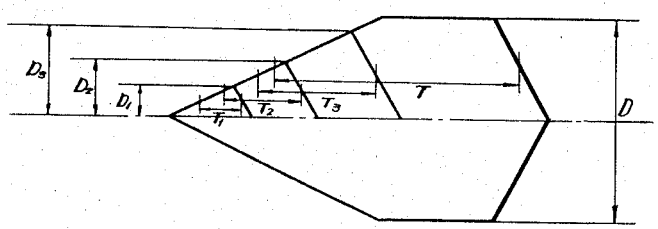

FIG. 4 schematically depicts the opening and shutting movement of the sectors.

Figure 1:
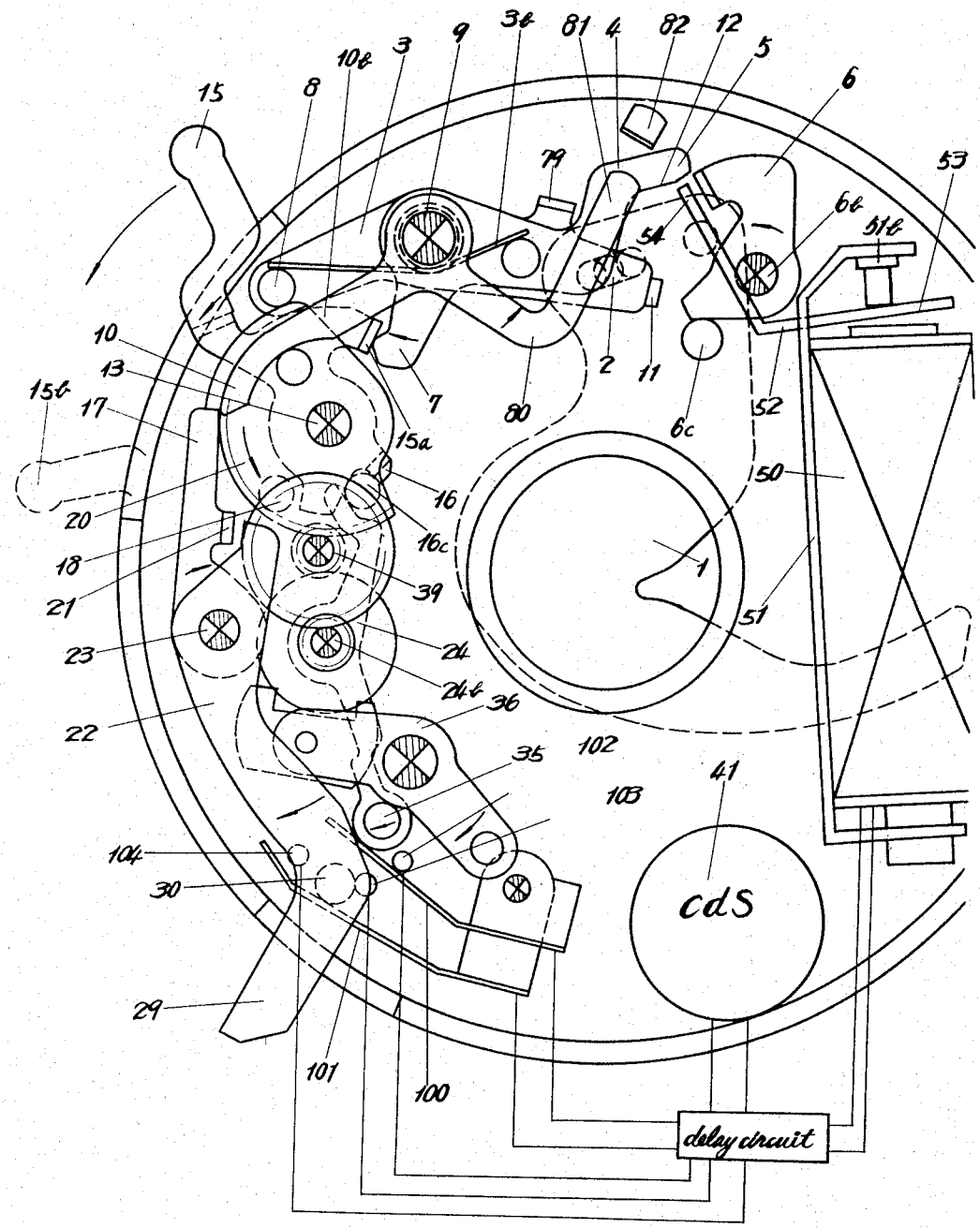
FIG. 1 is a front elevation view of a shutter mechanism in one embodiment of the present invention, and wherein the shutter is shown in the cocked position.
Figure 2:
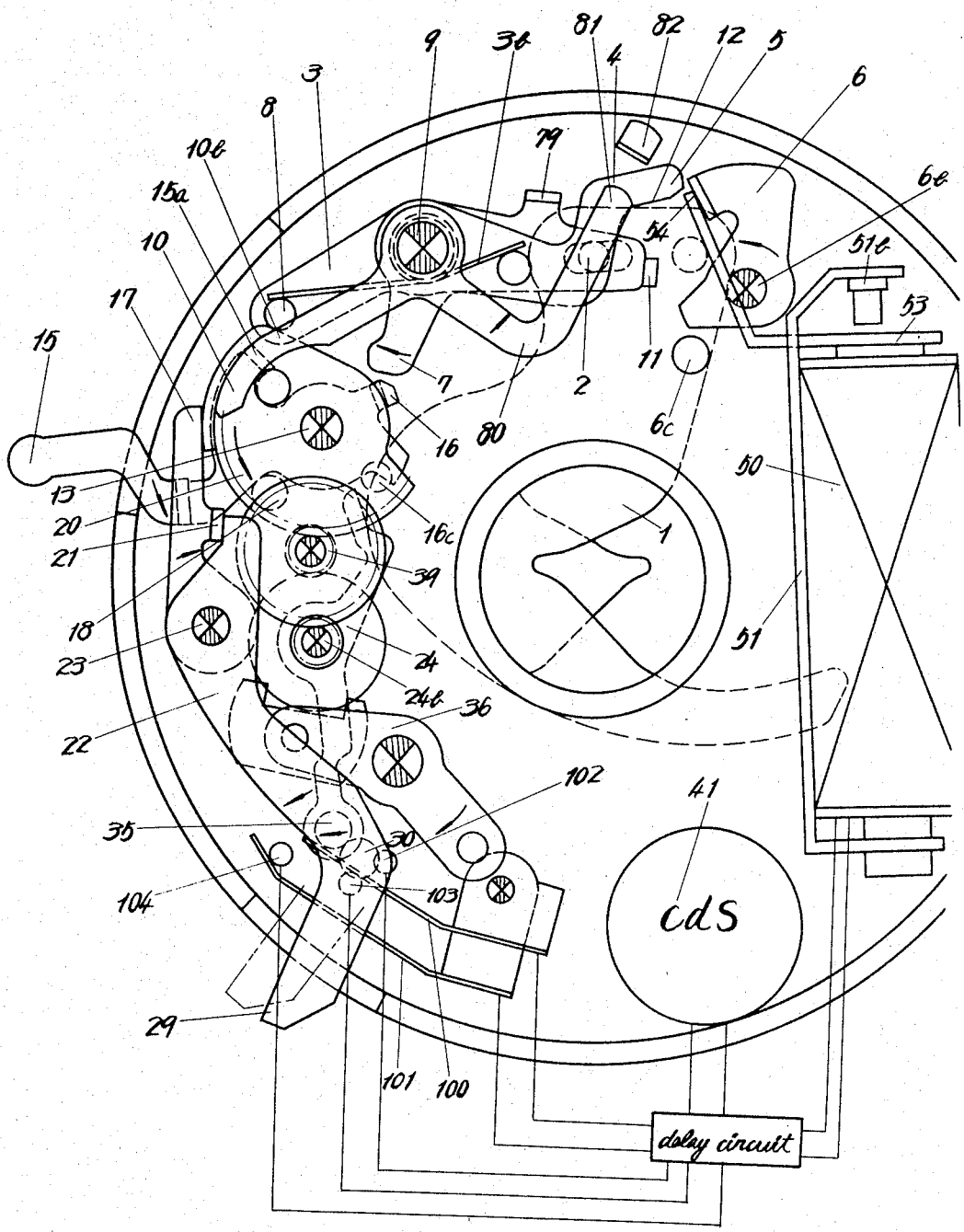
FIG. 2 is a front elevation view of a shutter mechanism of FIG. 1, but showing the sectors in the position wherein they are about to shut.
Figure 3:
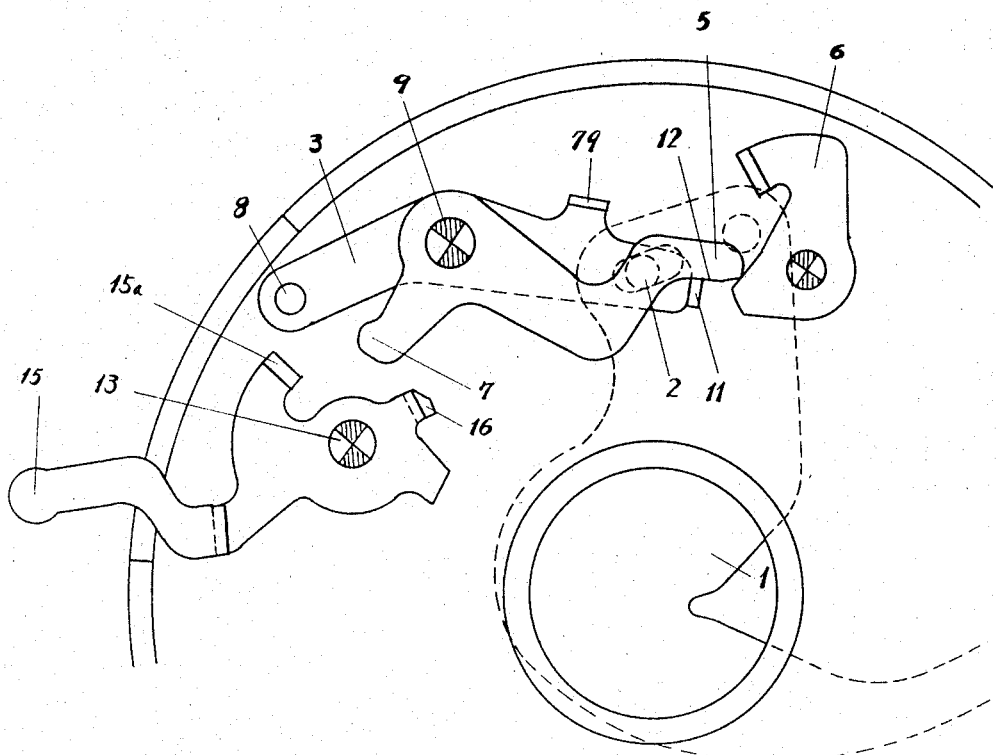
FIG. 3 depicts a view similar to that of FIG. 2, wherein the sectors are shown in the shut position i.e. when the exposure is completed.
Figure 5:
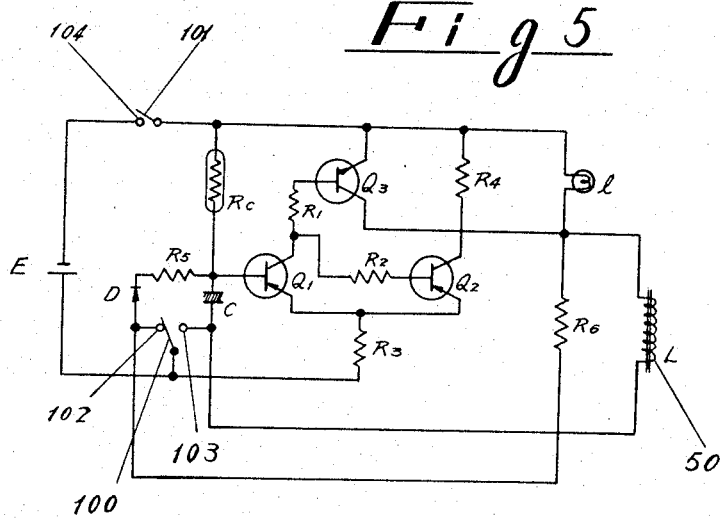

FIG. 5 shows a schematic diagram of an electronic timing circuit for controlling the shutter mechanism of FIGS. 1–3.

Figure 6:
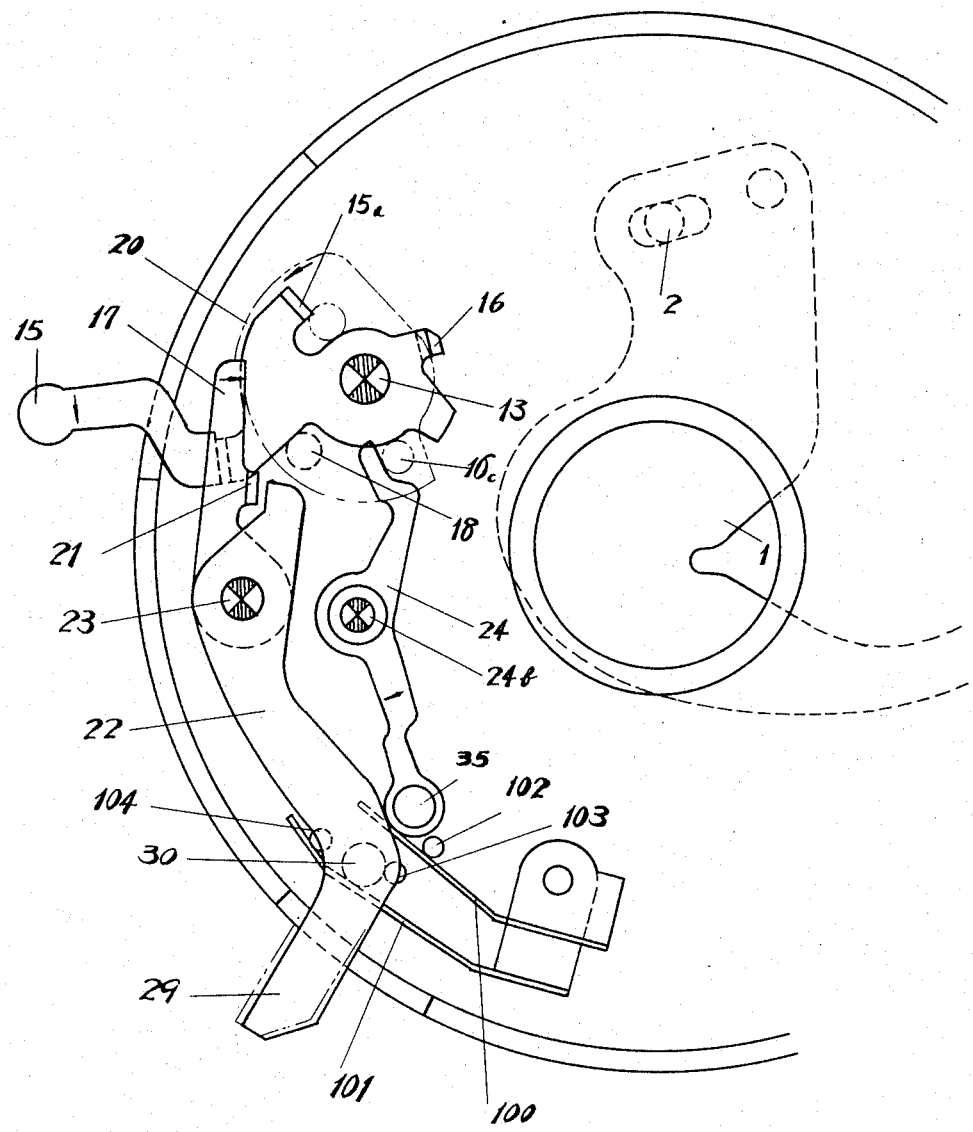

FIG. 6 shows the shutter mechanism of FIGS. 1–3, wherein the switch of the device is in the closed position.

Figure 7:
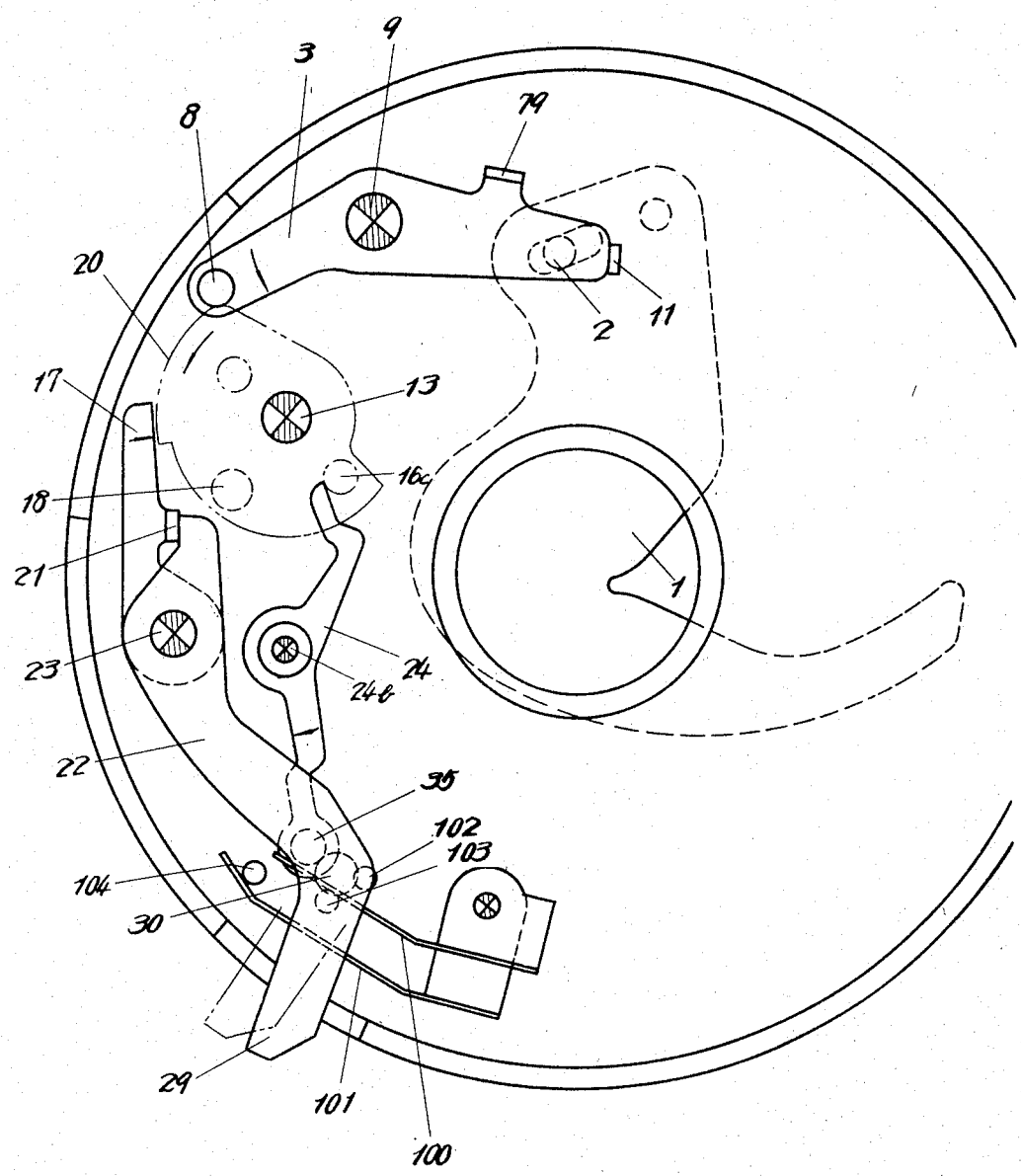

FIG. 7 is a front elevation view of the shutter mechanism of FIGS. 1–3, wherein the magnet switch depicted in FIG. 5 is in the closed position.

Figure 8:
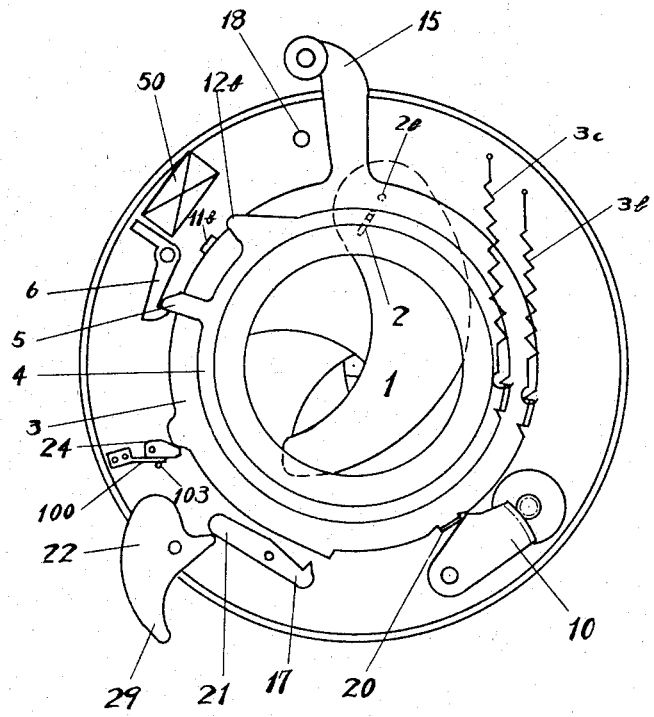

FIG. 8 shows another embodiment of a shutter mechanism in accordance with principles of the present invention wherein the sectors are in the slightly opened position.

In FIG. 1, sector 1, which is one of several sectors which controls both shutter speed and diaphragm opening, is shown engaging pin 2 on the sector opening member 3. Opening member 3 is urged by a spring-force in the counter-clockwise direction and shutting member 4 is urged in the clockwise direction. The projection 11 extending from opening member 3 is shown selectively engaging portion 12 of shutting member 4. Both members 3 and 4 are coaxially mounted on pin 9, with one end 5 of shutting member 4 engaging arresting lever 6, and the other end 7 engaging projection 15a of shutter cocking member 15. The device is cocked by moving the cocking member 15 clockwise around the axis 13.

FIG. 1 shows the position of the various members when operation is completed. When the external cocking force is removed, member 15 goes back to its initial position 15b, the charged position being where the member 15 collides against pin 18.

The first gear 10 is situated on axis pin 13 and has applied thereto a spring counter-clockwise rotation force. When the cocking member is cocked, the portion 16 of the member 15 pushes pin 16c, while the first gear 10 is cocked in a clockwise direction, so that gear 10 is arrested by arresting lever 17 and the member 15 returns to its original position separately.

The arresting lever 17 pivoted on axis pin 23 has applied thereto a clockwise spring force and falls into a jaw in the first gear 10 after the latter is cocked. As shown, first gear 10 is coupled with several gears, a star wheel and an anchor.

Release lever 22 which is situated on pin axis 23, is also under a counter-clockwise spring action force. An external force to provide release action is applied to one end 29 of the release lever 22. Pin 30, made of insulating material, sits on the lever 22 and is operative to push the contact 101 towards the outside by virtue of the spring power of release lever 22.

Contact 101 is spring urged inwardly and is caused to engage terminal 104 when lever 29 is pushed and pin 30 moves inwardly. Electric delay circuit switching lever 24 is rotatably spring mounted on axis 24b and is rotatable in a counter-clockwise direction, so that portion 16 of the cocking member 15 pushes the pin 16c when cocking member 15 is cocked. A pin 35, of insulating material is fixed to the switching lever 24 of the delay circuit.

When cocking member 15 is cocked electric delay circuit switching lever 24 rotates about pin 16c, pin 35 moves inwardly, contact 100 and pin 35 disengage from each other, and terminal 102 and contact 100 make contact. Contacts 100, 101, and terminals 102, 104 are electrically coupled with CdS cell 41, and magnet 50 of the delay circuit with the arresting lever 6 of shutting member 4 has applied thereto a spring counter-clockwise force about axis 6b, with pin 6c limiting the angle of rotation of the lever 6. In the position shown in FIG. 1, arresting lever 6 is closing shutting member 4, with pin 6c acting as a stop for further rotation with portion 54 of armature 52 being in close proximity to arresting lever 6 in the cocked position.

As armature 52 starts to move, being drawn by magnet 50, it strikes against lever 6 with accelerated speed to thereby release the shutting member 4.

As described above, FIG. 1 illustrates the cocked position of the device, while FIG. 2 shows the sectors beginning to shut, releasing shutting member 4 as a result of the actuation of the magnet after the sectors have opened to a predetermined size.

When portion 29 of the release lever 22 is actuated, an alarm circuit, as more fully explained hereinafter, is closed, and the release lever disengages locking lever 17 from first gear 10 by pushing portion 21 of locking lever 17. Accordingly, first gear 10 begins to turn in a counter-clockwise direction under its spring power, moving slowly since it is coupled with other gears. Cam part 10b of first gear 10 is coupled with pin 8 fixed on the opening member 3 and pin 8 slides along the cam surface of cam 10b in accordance with the rotation of first gear 10, and opening member 3 gradually opens sectors 1, when turned in a counter-clockwise direction by the force of spring 3b. The time interval during which sectors open to the prescribed size is previously to be determined in accordance with object of use in that occasion.

The relation between the size of the aperture and the opening time interval is diagrammatically shown in FIG. 4 with the diaphragm and shutter speed being previously programmed. By rotating the arresting lever 6 of shutting member 4 by magnet 50, shutting lever 4 is released and portion 12 keeps in contact with portion 11 of opening member 3. Accordingly, shutting member 4 turns in a clockwise direction together with opening member 3 by force of a spring (not shown) to close sector 1. Shutting member 4 is urged in a clockwise direction by another spring (not shown) in addition to spring 3b, but now shown in the figures.

FIG. 3 shows the closed position of the sectors with opening member 3 and shutting member 4 turning in the clockwise direction.

FIG. 4 diagrammatically shows the many possible combinations between effective exposure time $T_1, T_2, T_3 \ldots$ and aperture size $D_1, D_2, D_3 \ldots$ showing sectors opened to predetermined size and sectors shut by means of releasing of the shutting member. For example, $T_3$ and $D_3$ is the combination in the case of a large light intensity $T_1$, and $D_1$ in case of small light intensity.

Referring to FIG. 5, there is shown an electronic automatic exposure control for use in the present lens shutter system to provide an exposure time corresponding to the light intensity conditions of the subject to be photographed. The aforementioned electronic exposure control circuit comprises a transistorized Schmitt trigger circuit in conjunction with a photosensitive cadmium sulphide cell for determining the light intensity. The control circuit of FIG. 5 further includes an alarm circuit for indicating when the light intensity of the subject is inadequate for the present diaphragm aperture.

The Schmitt trigger circuit comprises transistor $Q_1$ and $Q_2$ having their emitters connected together to emitter resistor $R_3$. A driving transistor $Q_3$ has its base connected to the emitter of $Q_1$ through coupling resistor $R_1$, and the collector of $Q_1$ is coupled to the base of transistor $Q_2$ via resistor $R_2$. A cadmium sulphide cell, indicated as $R_c$, is connected between the emitter of transistor $Q_3$ and the base of transistor $Q_1$, while the collector of transistor $Q_2$ is connected to the emitter of transistor $Q_3$ through resistor $R_4$. Magnetic coil 50 is provided for driving the shutter blades and is connected at one end to the collector of transistor $Q_3$ with the other end thereof being connected to the base of transistor $Q_1$ through capacitor C. A single pole double throw shutter control switch is provided and comprises switch arm 100 and switch contacts 102 and 103 respectively, with contact 103 being connected to the junction of capacitor C and coil 50. The supply voltage is provided by battery E having its positive terminal connected to resistor $R_3$ and its negative terminal connected to cadmium sulphide cell $R_c$ through switch contacts 101 and 104. Switch contact 102 is connected to the base of transistor $Q_1$ through the series arrangement of diode D and resistor $R_5$.

The Schmitt circuit is operative to determine whether the ratio of the voltage on the base of transistor $Q_1$, to the potential on the positive terminal of battery source E, is higher or lower than a preselected reference value, this preference value being the product of the resistor $R_3$ and the emitter current of transistor $Q_2$ in the conductive state.

The operation of the electronic control circuit of FIG. 5 is as follows: Contacts 101 and 104 are closed providing a current path through the positive terminal of battery E, contact arm 100, through terminal 102, diode D, through resistor $R_5$ and photosensitive conductor $R_c$, with the base voltage of transistor $Q_1$ being the ratio of the resistance of resistor $R_5$ and photoconductor $R_c$. If the base voltage of transistor $Q_1$ is lower than the emitter voltage of transistor $Q_2$ in the conductive state, the base current of transistor $Q_1$ will flow from the emitter to the base of transistor $Q_1$, causing the transistor $Q_1$ to become conductive with current flowing from the emitter through the collector of transistor $Q_1$, through resistor $R_1$, the base of transistor $Q_3$, and the emitter of $Q_3$, causing transistor $Q_3$ to become conductive.

If the base voltage of transistor $Q_1$ is higher than the emitter voltage of transistor $Q_2$, there will be no base current through transistor $Q_1$, and transistor $Q_1$ will remain non-conductive, and accordingly transistor $Q_3$ will be non-conductive.

The alarm circuitry generally shown at alarm lamp L is operative as follows. When transistor $Q_3$ becomes conductive, current will flow through battery E, contact 100, switch terminal 102, resistor $R_6$, and through the collector to emitter path of transistor $Q_3$, with no current flowing through lamp L. However, when transistor $Q_3$ becomes conductive, current will flow through battery E, contact 100, switch 102, resistor $R_6$, and through lamp L causing it to light up.

When the ambient light intensity is lower than a preselected level, the resistance of photoconductor $R_c$ will accordingly be higher than the corresponding resistance value, and, therefore, the base voltage of transistor $Q_1$ will be higher than the corresponding preselected voltage, causing transistor $Q_1$ to be rendered non-conductive and lamp L, accordingly, to become lit. However, when the ambient light intensity is higher than the preselected value, the resistance of photoconductor $R_c$ will be less than the preselected value, and thus the base voltage of transistor $Q_1$ will be lower than the preselected voltage, causing transistor $Q_1$ to become conductive and lamp L to remain unlit.

When switch arm 100 makes contact with stationary contact 103, current will flow from the positive terminal of battery E, through capacitor C, photoconductor $R_c$, switch contacts 101 and 104, through battery E. At the same time another current path is produced from the positive terminal of battery E through resistor $R_3$, the emitter to base conduction path of transistor $Q_2$, through resistor $R_2$, resistor $R_1$, through the base to emitter current conduction path of transistor $Q_3$, and through switch contacts 101 and 104 to battery E.

A third conduction path is set up at the same time, from the positive terminal of battery E, resistor $R_3$, through the emitter to collector path of transistor $Q_2$, through resistor $R_4$, switch contacts 101 and 104, to battery E. During this time, the base voltage of transistor $Q_1$ will be substantially equal to the stored charge voltage across capacitor C. The charged voltage developed across capacitor C increases with time, and when this charged voltage is lower than the voltage on the emitters of transistor $Q_1$ and $Q_2$, base current will flow from the emitter to base of transistor $Q_1$, causing transistor $Q_1$ to become conductive.

During the period of conduction of transistor $Q_2$, the voltage across resistor $Q_3$ developed by the emitter current of transistor $Q_2$ will constitute the above-mentioned reference voltage. The time required for the charged voltage across capacitor C to build up to the reference voltage will depend on the product of the capacitance of capacitor C, and the resistance of photoconductor $R_c$, this time representing the RC delay i.e., exposure time.

When transistor $Q_1$ becomes conductive, transistor $Q_3$ will also be rendered conductive, with current flowing from the positive terminal of battery E, through magnetic coil 50, through the collector to emitter path of transistor $Q_3$, and back to the negative terminal of battery E, causing magnetic coil 50 to energize. Thus, the delay, or exposure time, which corresponds to the RC time constant of capacitor C and photoconductor $R_c$ will be inversely proportional to the ambient illumination i.e., will be short when the ambient illumination is at a high level, and will be long when the ambient illumination is at a low level.

FIG. 6 illustrates the situation in which the switch of the alarming lamp is initially on, that is $R_4$ is so selected that the lamp 1 shown in FIG. 5 is lit in the case that the subject is too dark to be photographed, and this is accomplished by bringing terminal 101 in contact with terminal 104.

FIG. 7 shows the situation wherein the magnet switch is on after the shutter is released, that is, contact 100 and terminal 103 are brought into contact with each other, so that the circuit shown in FIG. 5 is closed and current flows through magnet 50.

In FIG. 8, another embodiment of the invention is shown in which the opening member and the shutting member are both of the ring type. Each support of sector 1 is engaged on both the above members respectively, so that the sectors open gradually keeping contact with governor 10 after releasing of the opening member.

When the magnet releases the shutting member, the same rotates rapidly and closes the sectors while keeping contact with the opening member. Thereafter the sectors can rotate together with both the opening and shutting members as the case may be.

In order to facilitate a clear understanding of the operation of the preferred embodiment of the present invention, the direction of the spring force, as indicated by arrows have been shown rather than the springs themselves.

While there has been shown a particular embodiment of the invention, it will be understood that it is not wished to be limited thereto, since modification can be made both in the circuit arrangement and instrumentalities employed and it is contemplated, in the appended claims to cover any such modifications as fall within the true spirit and scope of this invention.

We claim:

1. In a camera, a single blade means functioning both as a diaphragm and a shutter, said blade means having a normally closed position and being displaceable gradually away from said closed position to provide an exposure aperture of gradually increasing size, said blade means then being displaceable back to said closed position thereof for terminating the exposure, opening means operatively connected to said blade means for displacing the latter from said closed position thereof so as to provide an exposure aperture, retarding means operatively connected with said opening means for retarding the operation thereof to provide a predetermined rate of opening movement of said blade means in response to actuation thereof by said opening means, closing means operatively connected to said blade means for displacing the latter rapidly back to said closed position thereof, manually operable cocking means connected with said opening means for cocking the latter, release means operatively connected to said opening means to release the latter for operation after said opening means has been cocked, electromagnetic means coacting with said closing means to release the latter for closing said blade means upon energizing of said electromagnetic means, and photosensitive delay circuit means operatively connected with said electromagnetic means for energizing the latter in accordance with the lighting conditions, said photosensitive delay circuit means energizing said electromagnetic means in a relatively short period of time under conditions of great light intensity to provide a relatively small aperture and exposure time by way of said single blade means and said photosensitive delay circuit means energizing said electromagnetic means after a relatively long period of time under conditions of relatively low light intensity to provide a relatively large aperture and exposure time, and switch means operatively connected to said delay circuit means to close the latter for operation, said switch means being actuated by said release means for closing said delay circuit means when said release means is actuated to release said opening means for operation.

2. The combination of claim 1 and wherein said closing means is also cocked by said manually operable cocking means.

3. The combination of claim 2 and wherein an electrical signal means is provided for signalling when the lighting conditions are not capable of providing a proper exposure, said release means being movable from an initial position to a release position and said release means actuating said signal means when situated between said initial position and release position, so that before the release position is reached by said release means a signal will be given as to whether or not a proper exposure can be made.

4. The combination of claim 2 and wherein a stop member is situated in the path of movement of said closing means to prevent operation thereof, said electromagnetic means including an armature which displaces said stop member away from said closing means upon energizing of said electromagnetic means, so as to release said closing means for operation.

References Cited

UNITED STATES PATENTS 2,179,717   11/1939   Fedotoff _____ 95—60

(Other references on following page)

UNITED STATES PATENTS

| | | | |
|---|---|---|---|
| 2,800,844 | 7/1957 | Durst et al. | 95—60 |
| 3,013,478 | 12/1961 | Gebele | 95—10 |
| 3,117,503 | 1/1964 | Ohara | 95—10 |
| 3,118,356 | 1/1964 | Sauer et al. | 95—10 |
| 3,125,937 | 3/1964 | Bing et al. | 95—10 |
| 3,143,047 | 8/1964 | Sherwood | 95—10 |
| 3,165,989 | 1/1965 | Kiper | 95—10 |
| 3,176,598 | 4/1965 | Müller | 95—10 |
| 3,199,425 | 8/1965 | Starp | 95—10 |
| 3,199,428 | 8/1965 | Kiper | 95—62 |
| 3,200,723 | 8/1965 | Topaz | 95—11.5 |
| 3,208,365 | 9/1965 | Cooper et al. | 95—60 |

JOHN M. HORAN, *Primary Examiner.*